United States Patent [19]
Maier

[11] 3,918,311
[45] Nov. 11, 1975

[54] SINGLE-LEVER CONTROL MECHANISM
[75] Inventor: Konrad Maier, Walldorf, Germany
[73] Assignee: Gesellschaft fur Steuerungstechnik mbH & Co.
[22] Filed: July 2, 1974
[21] Appl. No.: 485,238

[30] Foreign Application Priority Data
July 3, 1973 Germany.............................. 2333744

[52] U.S. Cl..................................... 74/37; 74/371
[51] Int. Cl.² ........................................ F16H 19/06
[58] Field of Search............ 74/519, 37, 501 R, 371, 74/876, 471 R, 473 R

[56] References Cited
UNITED STATES PATENTS
741,789   10/1903   Harrison .............................. 74/371
1,097,333   5/1914   Kinmont ................................. 74/37

Primary Examiner—Samuel Scott
Assistant Examiner—Frank H. McKenzie, Jr.
Attorney, Agent, or Firm—Gilbert L. Wells

[57] ABSTRACT

In a control box there are two sprocket wheels positively secured to one shaft that is rotatable by one single lever located outside of the box. On each wheel an endless sprocket chain is supported and guided around several pulleys in the housing. One sprocket member of each chain is provided with a sliding block which engages a slot in a slide to which a power transmitting element, such as a push-pull-cable, is connected. By the specific arrangement of the pulleys and/or a suitable shape of the slots various movements of the power transmitting elements relative to one another may be caused upon rotation of the one single actuation lever.

6 Claims, 13 Drawing Figures

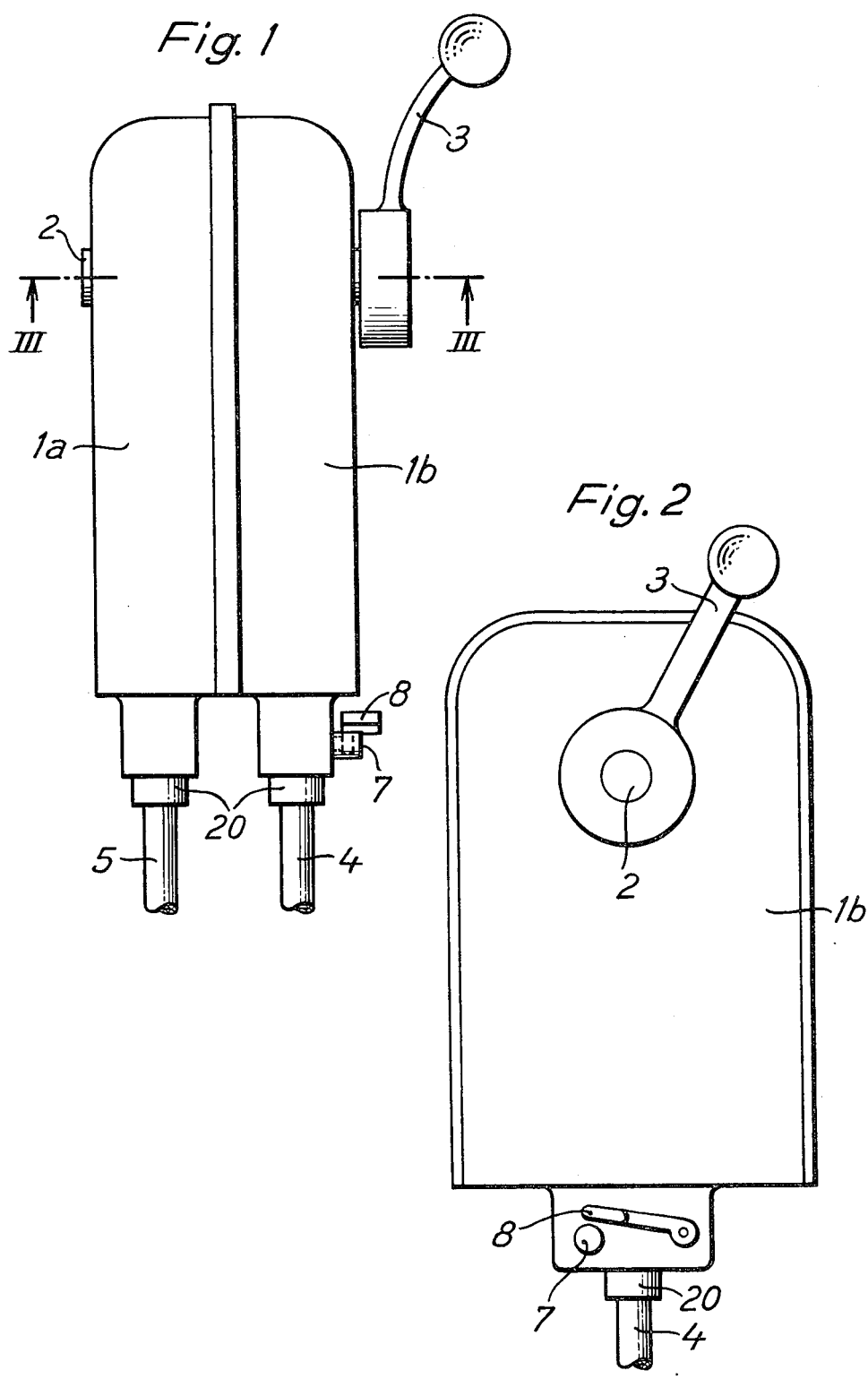

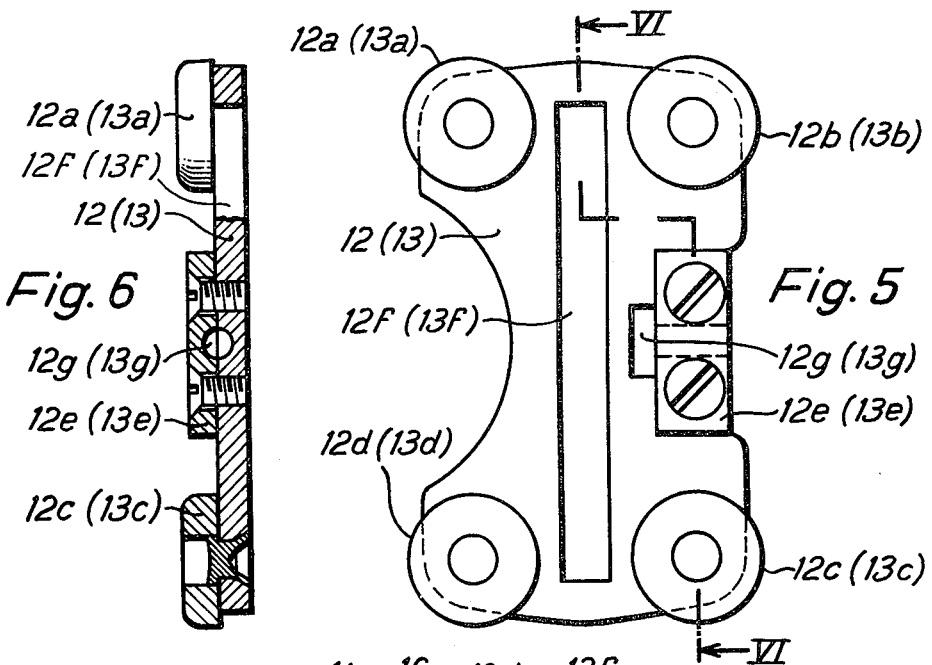
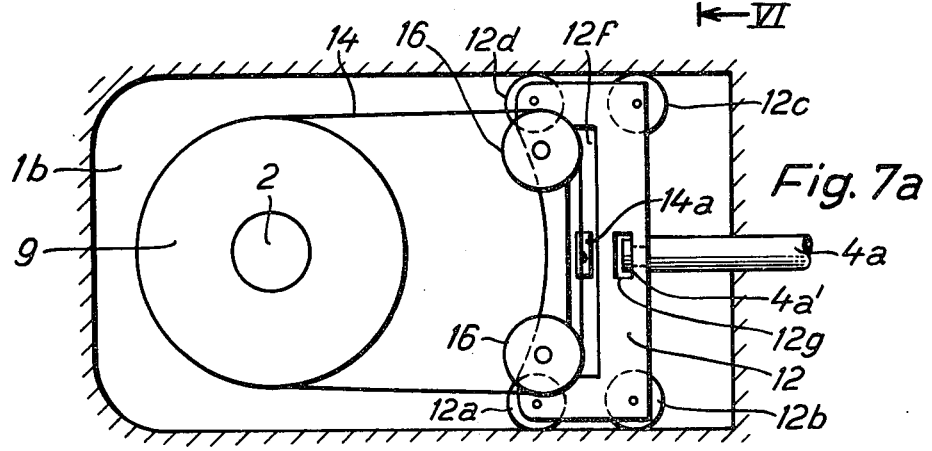
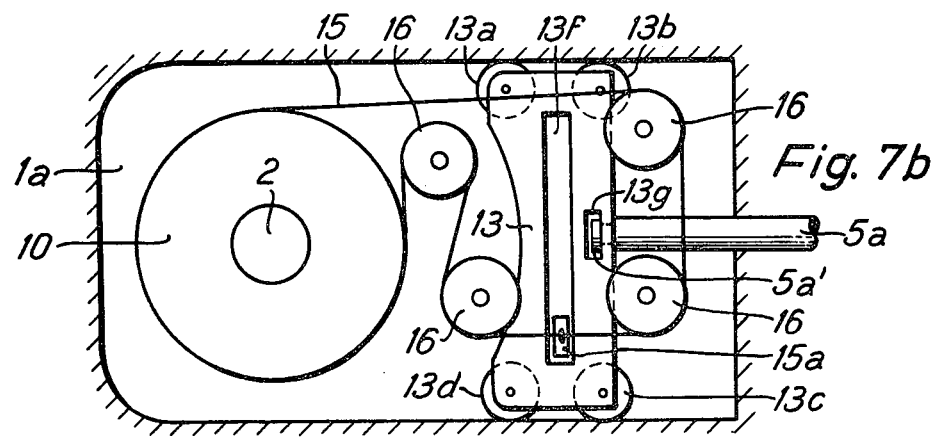

SINGLE-LEVER CONTROL MECHANISM

BACKGROUND OF THE INVENTION

The present invention relates to control mechanisms for power transmitting. Particularly to such mechanisms which are used for operating power transmitting elements, such as tracker wires and push-pull-cables.

In many fields of application of such control mechanisms there exists the necessity of controlling two or more movements of the power transmitting elements in a certain relation and interdependence to one another; for example in such a manner that in the beginning a first operation of a machine has to be started slightly, than a second operation has to be fully controlled, and in the end the first operation has to be completed.

An example of such a sequence of operations may be found in the concrete mixer trucks. In such trucks the concrete mixer may be operated by the truck engine through a suitable clutch. When the mixer is to be emptied first the truck engine must be brought to a certain initial speed while the truck gear is in neutral, then the clutch must be let in, and finally the truck engine must be speeded up.

Like applications may be found in vibrating road rollers where first the roller must be set in motion and then the vibration must be started; and also in boat motors where the gear must be first shifted to forward or reverse and then the throttle must be opened.

Usually these operations are controlled by two different power transmitting elements, as for example cables, which are actuated seperately. In particular, embodiments of control boxes are known which comprise two or more gears fixed on concentric shafts. Each gear is in driving connection with a rack to which the cable is fastened and each shaft ends in an actuation lever outside of the control box. It is essential in this connection that the control box has a plurality of levers each of which must be rotated separately.

It is, therefore, an object of the invention to overcome the disadvantage of the individual operation of the levers and to provide for such an interdependent driving engagement of the power transmitting elements that all elements present in a control box may be operated in the required relation to one another by actuating only one single lever.

SUMMARY OF THE INVENTION

The above stated object is attained by a control mechanism which comprises in a box a plurality of sprocket wheels fixed on one common shaft and rotatable by one single lever arranged on the shaft outside of the housing. Each sprocket wheel carries an endless sprocket chain, each of which being guided around pulleys suitably mounted in the housing. One sprocket member in each chain is provided with a pin projecting substantially at right angles from the chain and carrying a sliding block which engages a slot in a slide. The each chain there is allocated one slide and all slides are guided in suitable guide means so as to be movable substantially in parallel to the direction of movement of the chain and sliding block. Power transmitting elements are connected to the slides.

Upon rotation of the single lever all sprocket wheels are rotated and the chains are moved, thereby driving the slides and the cables or rods connected thereto. It will be apparent that it is merely a question of the manner in which the pulleys are arranged in combination with the shape of the slots in order to produce almost any specific relation in the movement of the slides relative to one another. Thus the power transmitting elements execute any movement that may be required in connection with a certain machine and/or sequence of operations.

Further it is suggested to secure the sprocket wheels to the shaft by means of keys and key ways and to make the shaft displaceable in the axial direction. The shaft with the key may then be pulled out of the key way of at least one wheel so that upon rotation of the shaft this one wheel remains unmoved while only the rest of the wheels, chains and slides are rotated and displaced respectively. Such a design may be used, for example, with boat motors where it is required to test the motor by opening the throttle without putting the engine into gear.

Although it is readily possible to connect all sorts of power transmitting elements to the slides, such as cables, rods etc., it is understood that mostly push-pull-cables will be used of which the core is connected to the slide while the conduit is connected to the housing. In order to provide for the execution of an additional operation it is suggested to connect the conduit detacheably to the housing and to arrange means by which the conduit itself may be moved. In a known manner the displacement of the conduit results in an additional movement of the core which may be used, for example, for switching off the engine of a truck altogether.

BRIEF DESCRIPTION OF THE DRAWINGS

The invention will be more readily comprehended from the following description when taken in conjunction with the appending drawings wherein an embodiment of the invention is illustrated which comprises two sprocket wheels in the control box, and wherein:

FIG. 1 is a side view of the control box,

FIG. 2 is a front view of the control box,

FIG. 5 is a front view of a slide,

FIG. 6 is a sectional view of the slide cut along line VI—VI in FIG. 5,

FIGS. 7a and 7b show schematically the arrangement of the pulleys and the path of travel of the sprocket chain in an embodiment suitable for a boat motor.

DESCRIPTION OF THE PREFERRED EMBODIMENTS

Figure 3:
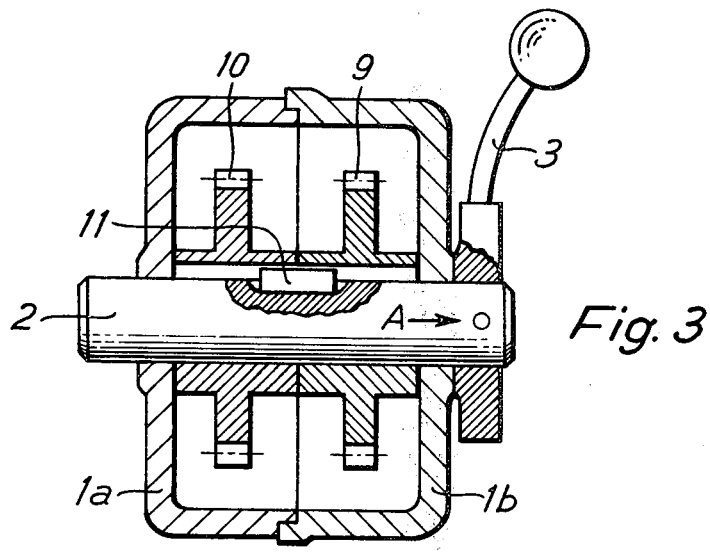
FIG. 3 is a sectional view of the control box cut along line III—III in FIG. 1.

Referring now to the drawings, in FIG. 1 the two portions of a control box are designated 1a and 1b. From the box extends a shaft 2 which carries a single actuation lever 3. A first and a second conduit 4 and 5 of two push-pull-cables are shown to be connected to the lower side of the box. The conduit 4 is connected to the box by means of a push button 7 which locks a fitting in the wall of the box wherein the conduit ends. The cooperation of the push button 7, the fitting and an additional lever 8 is in more detail explained hereinafter with reference to FIG. 10.

From FIG. 3 it will be understood that in the box there are a first and a second sprocket wheel 9 and 10 mounted on the shaft 2. To this end the shaft 2 carries a key 11 which engages with one end a keyway in the sprocket wheel 9 and with the other end a keyway in the sprocket wheel 10. By rotating the actuation lever 3 both sprocket wheels are therefore also rotated.

The shaft 2 may in addition be pulled axially in the direction of the arrow A so that the key 11 engages only the keyway in the sprocket wheel 9. As a consequence thereof the latter wheel is rotated alone when the lever 3 is operated, while the sprocket wheel 10 remains stationary. When both keyways are again in alignment the shaft 2 may be pushed in the opposite direction and both sprocket wheels will again be coupled to one another. It will be apparent that the position of the sprocket wheels relative to one another will then again be the same as before.

Figure 4:
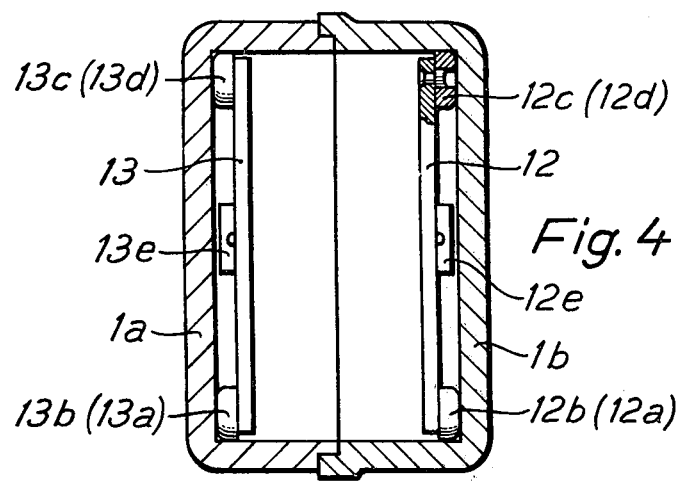
FIG. 4 is a sectional view of the control box showing the two slides.

In the box there are, further, provided a first and a second slide 12 and 13 which are slideable in a direction perpendicular to the shaft 2 (FIG. 4). These slides are shown in detail in the FIGS. 5 and 6. Each slide comprises four rollers 12a – 12d and 13a – 13d respectively which are rotatable on the slides and by means of which the slides are guided along the inner walls of the box.

To one side of each slide are connected the cores 4a and 5a of the push-pull-cables. The manner in which the connections are established may especially be seen from the FIGS. 5 and 6. Each slide is provided with a recess 12g and 13g respectively into which locks a projection 4a and 5a of the core end. Behind the projections, plates 12e and 13e respectively are placed across the cores and secured to the respective slide by screws. This manner of fastening the core to the slide is shown only schematically in the other drawings and may, also, be varied in details. However, this manner of fastening is simpler and quicker than screwing the core into the respective member of the control unit, as done in prior art devices.

Each slide is provided with a slot 12f and 13f respectively and in each slot there is guided a sliding block 14a and 15a respectively. The sliding block 14a is connected to a sprocket chain 14 by a pin and in like manner the sliding block 15a is connected to a sprocket chain 15. The sprocket chain 14 is supported by the sprocket wheel 9 and the sprocket chain 15 is supported by the sprocket wheel 10. Each of the sprocket chains is an endless chain and is, further, guided around a number of pulleys 16 mounted on the housing walls. The arrangement of the pulleys is decisive for the path through which each chain travels.

As has been shown the control box comprises a first and a second sprocket wheel, a first and a second sprocket chain, and a first and a second slide. By particularly arranging the pulleys 16 of one chain a particular movement of the slide may be caused and a specific relation of the movements of the slides relative to one another may be brought about. It will be readily comprehended that the slide will remain at a stand-still whenever the chain portion with the sliding block travels in parallel to the slot in the slide because then only the sliding block moves in the slot while the slide itself remains stationary. If, however, the chain portion with the sliding block travels in a direction which is different from the slot direction then the slide is pushed in a direction perpendicular to the shaft 2. The core which is fastened to the slide is then, of course, also pushed or pulled and the gear that is connected to the other end of the core is switched or shifted.

By arranging the pulleys 16 in a specific way two operations may be simultaneously controlled in almost any relation to one another just by rotating one singel lever 3. The arrangement of the pulleys may, for example, be such that the beginning of rotation of the lever 3 first starts one operation while the other slide is still at rest. However, the arrangement can also be made so that both operations are started simultaneously. There are unlimited variations possible. Preferred angular positions of the lever 3 may be secured by resilient detents and/or abutments.

The FIGS. 7a and 7b, 8a and 8b, 9a and 9b illustrate three different adjustments of two operations relative to one another. These examples represent three typical adjustments as they are required in connection with machines used in everyday life, i.e. with boat motors, vibration street rollers, and concrete mixer trucks.

The FIGS. 7a and 7b show schematically the arrangement of the pulleys 16 in a gear box for controlling a boat motor. Boat motors require that first the gear is fully shifted from neutral to forward or reverse and that only thereafter the throttle is opened. Therefore the core 5a is connected to the gear while the core 4a is connected to the throttle. When the sprocket wheels 9 and 10 are rotated from their rest position, (=middle position) first the slide 13 with the cable 5a is moved; i.e. the gear is shifted to forward or reverse. The sliding block 15a in FIG. 7b travels from the left to the right side and thereby displaces the slide 13. At the same time the sliding block 14a in FIG. 7a travels either in an upward or in a downward direction. But this movement does not result in a displacement of the slide 12. Only after the sprocket wheels have been rotated through such an angle that the sliding block 14a moves around one of the adjacent pulleys 16 the block begins to displace the slide 12 with core 4a, this means that now the throttle is opened. During the operation, however, the slide 13 with core 5a remains at a standstill so that the gear is not shifted. When the lever 3 and sprocket wheels are rotated in opposite direction the two operations are also performed in a reverse order so that first the throttle is closed (slide 12) and only thereafter the gear is shifted to neutral. Boat motors, however, require also that the throttle be opened without shifting the gear in order to warm up the engine. Especially to meet this requirement there is provided for a decoupling of the two sprocket wheels as shown in FIG. 3. When the shaft 2 is pulled in the direction away from the control box only the sprocket wheel 9 remains coupled to the lever 3 and may be rotated alone without moving the sprocket wheel 10. This has the effect that the throttle is opened while the gear remains in neutral. When the throttle is again closed the previous adjustment of the throttle and the gear is again achieved when the key 11 is in alignment with the keyway in the wheel 10. The shaft 2 may then be pushed so that proper coupling of the two wheels is again established. The position of the shaft in its pulled and pushed state may be secured by detent means and/or abutments which are not shown in order not to complicate the drawing unduly.

Figure 8A:
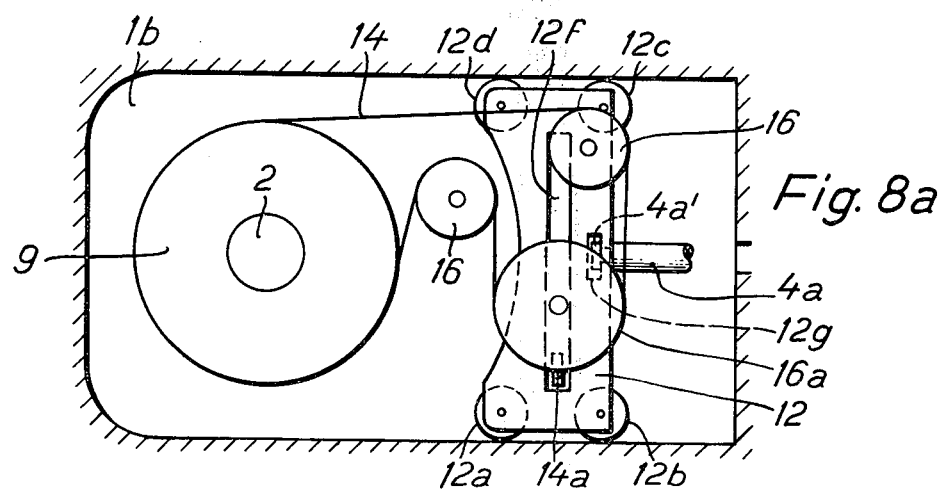
FIGS. 8a and 8b show schematically the arrangement of the pulleys and the path of travel of the sprocket chain in an embodiment suitable for a vibration road roller.
Figure 8B:
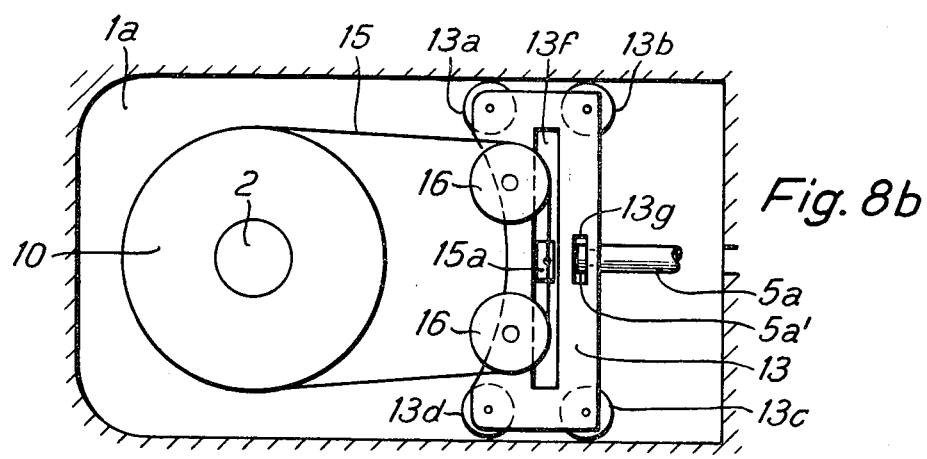

The control box shown in the FIGS. 8a and 8b is intended for a vibration road roller. In such a roller the drive mechanism for the eccentric mass which causes the vibration must not be switched on prior to starting the roller to move in a forward or reverse direction. Otherwise the roller would practically batter a shallow groove or recess in the road surface. These conditions are similar to those described with reference to the boat motors. Here again one operation must be fully completed (gear shifted from neutral to forward or reverse) before the second operation may be started (switching-on of the vibration mass). Therefore the gear of the roller is connected to the slide 12 by the core 4a (FIG. 8a) while the drive mechanism of the eccentric mass is connected to the slide 13 through the core 5a (FIG. 8b). Upon beginning of the rotation of the sprocket wheels the slide 14 is immediately displaced by the sliding block 14a which moves around a pulley 16a of a somewhat larger diameter. During this period the sliding block 15a travels in the slot 13f without displacing the slide 13. Only after completion of the gear shift, i.e. when the sliding block 14a slides in parallel to the slot 12f, the sliding block 15a moves around an adjacent pulley 16 and now starts to displace the slide 13, thereby switching on the drive mechanism for the vibration mass. When the lever 3 is rotated in reverse direction first the vibration is switched off and thereafter the slide 12 is displaced. Thereby the gear of the roller is shifted to neutral through the core 4a.

Figure 9A:
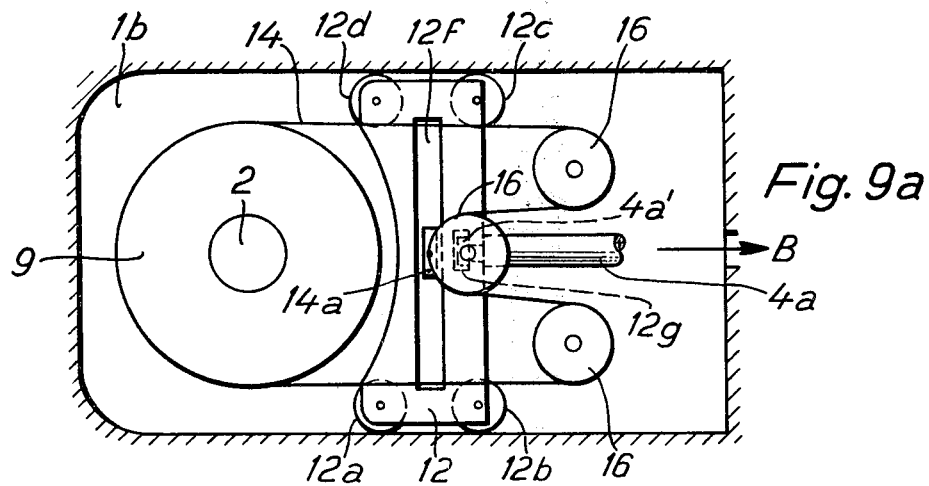
FIGS. 9a and 9b show schematically the arrangment of the pulleys and the path of travel of the sprocket chain in an embodiment suitable for a concrete mixer truck.
Figure 9B:
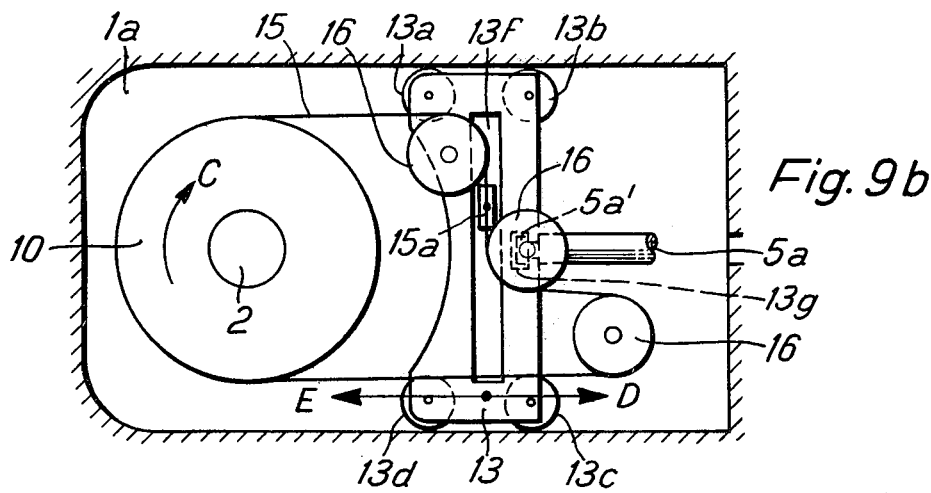

FIGS. 9a and 9b illustrate an embodiment of a control box for a concrete mixer truck. When the mixing drum of such a truck is to be emptied at the construction site two operations must be controlled:

one operation is the direction of rotation and the speed of the drum driving motor and the other operation is letting in a clutch which couples the drum to the motor. This motor may be a separate motor which drives only the drum, however, it may also be the truck engine which runs in neutral when the drum is emptied. The clutch may be a mechanical clutch, but in most instances it will be a hydraulic clutch.

The operations must be controlled in such a manner that first the speed of the driving motor is increased, then the clutch is slightly let in and then the speed and the clutch are together continuously increased and let in respectively. Thereby it is achieved that the speed of the motor is only increased to such a degree which is momentarily required by the drum rotation.

Such an interdependence and coordination of the two controlled operations is achieved by the control box in the FIGS. 9a and 9b. The slide 12 and the core 4a control the driving motor while the clutch is controlled by the slide 13 and the core 5a. Upon rotation of the lever 3 and the sprocket wheels 9 and 10 from their shown rest position first the slide 12 is displaced in the direction of the arrow B. Corresponding to the circumference of the central pulley 16 this is an initially slow displacement until after a rotation of the pulley through an angle of 90 the maximum speed of the displacement is reached. Contrary thereto the slide 13 is not displaced at the beginning because the sliding block 15a merely slides in the slot 13f. Only when the pin 15 of the sprocket chain comes into contact with one of the adjacent pulleys 16 the slide 13 will also be displaced. This displacement is also slow at the beginning until, again after a rotation of the pulley 16 through an angle of 90, the maximum speed of the displacement is reached.

With these slide displacements relative to one another the control box achieves the above described object: At the beginning the speed of the driving motor is increased to an extent where the motor will stand a certain load. During this period the clutch is still in its decoupled state. However, after the necessary speed of the motor has been reached the clutch is slightly let in and from this moment on the speed of the motor and the load on the motor are simultaneously and continuously increased. The driving motor is thus in a certain way pre-adjusted and this pre-adjustment may be different, depending on whether the drum is rotated for mixing or for discharging. The difference in the adjustment is brought about by the difference in distance between the sliding block 15a and the two adjacent pulleys 16.

Mixing the concrete or discharging the drum is achieved by actuating the lever 3 in opposite direction. However, this has no effect on the speed regulation of the driving motor. As may be clearly seen from FIG. 9a the slide 12 is displaced in the same direction of the arrow B without regard whether the sprocket wheel 9 is rotated in a clockwise or in a counter-clockwise direction. This causes the throttle to be opened to the same degree. However, as may also be seen from FIG. 9, the rotation of the sprocket wheel 10 in a clockwise or in a counter-clockwise direction has indeed its influence on the time difference with which the clutch is let in. If the sprocket wheel 10 is rotated in the direction of the arrow C the clutch is let in much earlier after the start of the motor than in the opposite direction. The rotation in this direction may be applied if the drum is to be rotated for mixing of the concrete (=displacement of the slide 13 in the direction of the arrow D) while the opposite direction of rotation may be used for emptying the drum.

Figure 10:
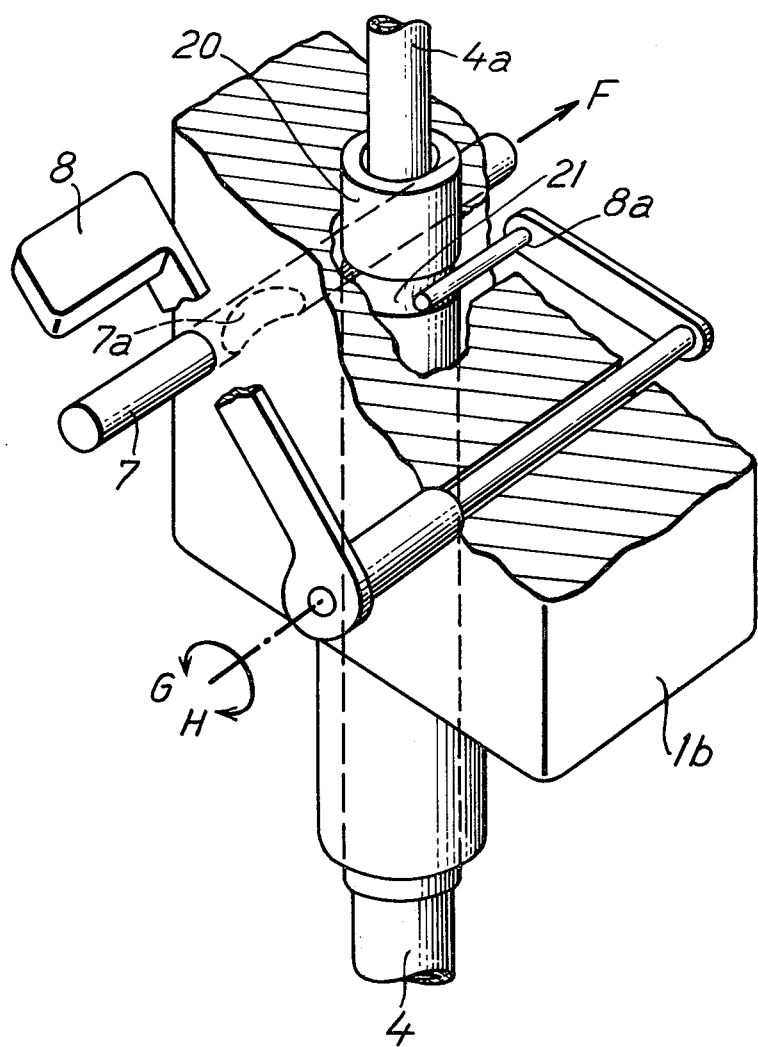
FIG. 10 shows in a perspective view the detacheable connection of the conduit of a push-pull-cable at the control box.

Especially boat motors — but very often other machines also — may require the independent control of an additional operation by which, for example, the engine is shut off altogether. This operation may be controlled by the conduit of the push-pull cables. To this end the conduit is attached to the control box by a quick-locking device as schematically illustrated in FIG. 10.

The conduit 4 ends in a fitting 20 which is plugged into a hole in the box portion 1b. The fitting has a circular groove 21 which is engaged by a pin 7 in the box portion. The pin 7 may be pushed in the direction of the arrow F against the force of a spring (not shown). This pin 7 locks the conduit in the control box.

The pin 7 is provided with a recess 7a of which the curvature corresponds substantially to the circumference of the fitting 20. When the pin 7 is pushed in the direction F the recess 7a comes in a position opposite to the fitting 20 so that the latter may be pulled from the hole. In the same manner, i.e. while the pin 7 was in its pushed position, the fitting was previously inserted into the hole and locked by releasing the pin 7.

Further, a swinging lever 8 is tiltably mounted on the box and engages the groove 21 from the rear by means of a pin 8a. By tilting the lever in the direction of the arrow G the conduit 4 may be pressed in a downward direction after the pin 7 has been previously pushed. The movement of the conduit caused thereby may be used for controlling a further operation.

If the conduit is to be removed from the box altogether the pin 7 must be pushed and the swinging lever 8 must be tilted in the opposite direction H so that the pin 8a is withdrawn from the groove 21. When the fitting is plugged into the box the pin 8a presents no obstacle since it yields in an upward direction.

Of course it is readily possible to fasten more than one conduit to the box in this manner. If, for example, both conduits are detacheably locked a fourth operation may be controlled independently from all the others.

Although the invention is described here with reference to an embodiment comprising slides to which only one cable is connected it will be apparent that more than one cable could be fastened to one slide so that a corresponding number of operations could be controlled in parallel to one another.

What is claimed is:

1. A single lever control mechanism for simultaneously controlling a plurality of operations of a machine in a pre-established relation to one another, the mechanism comprising:
   a. a housing;
   b. a shaft rotatably supported in said housing and extending therefrom at least on one side;
   c. an actuation lever mounted on said shaft outside of said housing for rotating said shaft in a clockwise and counter-clockwise direction;
   d. a plurality of sprocket wheels secured to said shaft for rotation therewith;
   e. a plurality of endless sprocket chains, each chain being supported by one of said sprocket wheels, a plurality of pulleys mounted on the housing walls at different locations and each of said chains being guided around one of said pulleys, one sprocket engaging roller of each chain being provided with a sliding block;
   f. a plurality of slides corresponding in number to the number of wheels and chains, each slide being provided with a slot for engagement by the sliding block of one chain;
   g. guide means for guiding the slides in a direction perpendicular to the axis of the shaft; and
   h. power transmitting elements connected to the slides, each one of said chains defining a path of travel around said respective pulleys mounted at different locations on the housing walls, said path of travel and the shape of said slot in each slide displacing each said slide in a different manner relative to all the other slides upon rotation of said actuation lever.

2. A single-lever control mechanism as claimed in claim 1, wherein the sprocket wheels are connected to the shaft by keys (11) and keyways and wherein the shaft is displaceable in axial direction while the sprocket wheels remain in their lateral position so that the key is withdrawn from the keyway of at least one sprocket wheel that remains at rest when the actuation lever is rotated.

3. A single-lever control mechanism as claimed in claim 1, wherein the power transmitting elements connected to the slides are the cores (4a;5a) of push-pull-cables of which the conduits (4;5) are secured to the housing.

4. A single-lever control mechanism as claimed in claim 3, wherein at least one conduit is detacheably connected to the housing and wherein means are provided for detaching and displacing the conduit in axial direction for executing an additional operation.

5. A single-lever control mechanism as claimed in claim 4, wherein a quick-locking device is provided for connecting the detacheable conduit to the housing.

6. A single-lever control mechanism as claimed in claim 1, wherein each slide is provided with a recess and the power transmitting element has a projection at the end which engages the recess and wherein a retainer plate is positioned across the projection and secured to the slide for fastening the power transmitting element to the slide.

* * * * *